Figure 1:
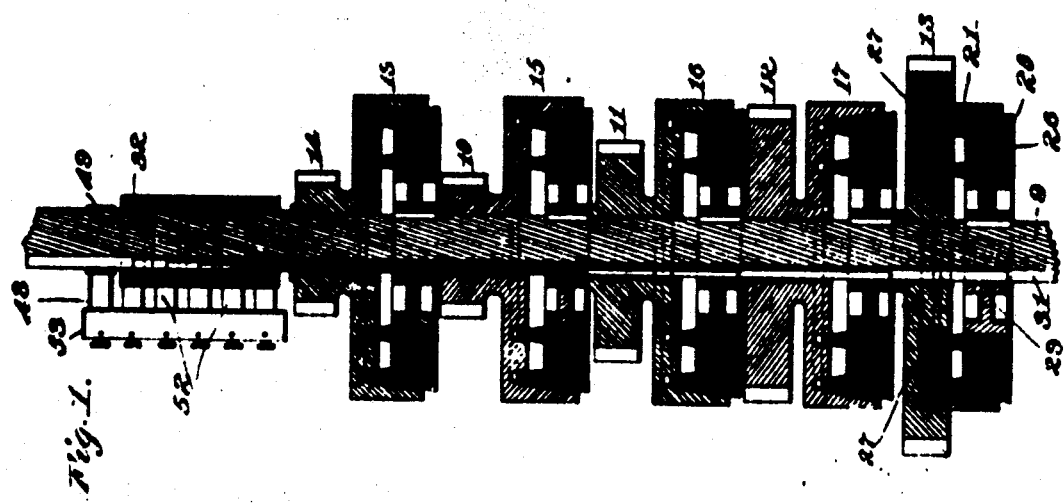

L. H. DYER.
ELECTRIC FRICTION CLUTCH.
APPLICATION FILED SEPT. 22, 1897. RENEWED DEC. 8, 1909.

965,166.

Patented July 26, 1910.
2 SHEETS—SHEET 1.

Witnesses.

Inventor
Leonard Hunt. ess. Dyer
by Frank L. Dyer,
Atty.

L. H. DYER.
ELECTRIC FRICTION CLUTCH.
APPLICATION FILED SEPT. 22, 1897. RENEWED DEC. 9, 1909.
965,166.
Patented July 26, 1910.
2 SHEETS—SHEET 2.
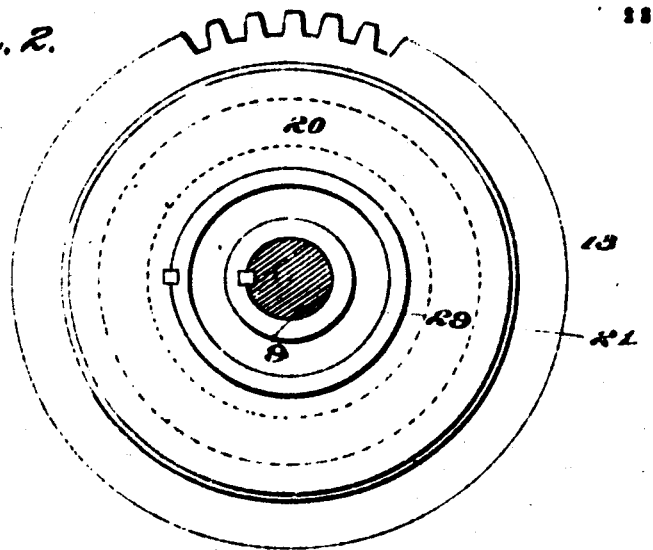
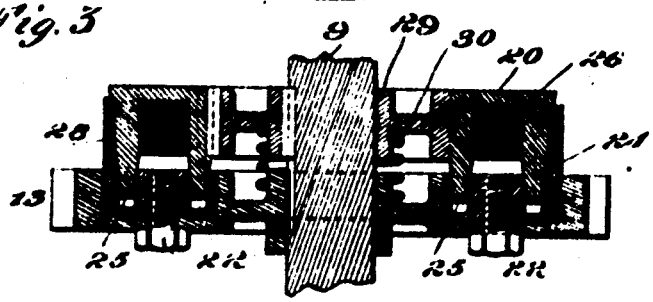
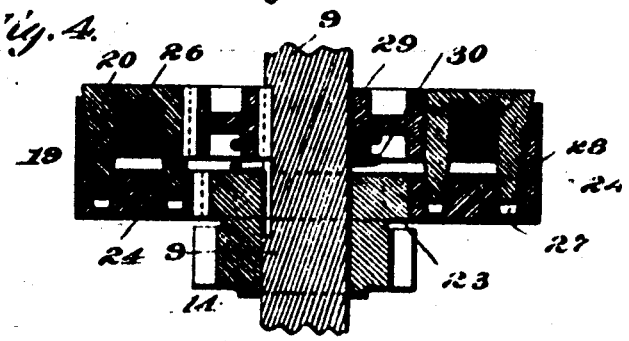
Witnesses.
Inventor
Leonard Huntress Dyer
by Frank L. Dyer
Atty

UNITED STATES PATENT OFFICE.

LEONARD HUNTRESS DYER, OF GREENWICH, CONNECTICUT, ASSIGNOR OF ONE-FOURTH TO FRANK L. DYER, OF MONTCLAIR, NEW JERSEY.

ELECTRIC FRICTION-CLUTCH.

965,166.  Specification of Letters Patent.  Patented July 26, 1910.

Application filed September 22, 1897, Serial No. 652,532. Renewed December 8, 1909. Serial No. 532,032.

*To all whom it may concern:*

Be it known that I, LEONARD HUNTRESS DYER, a citizen of the United States, residing in Greenwich, in the county of Fairfield, State of Connecticut, have invented certain new and useful Improvements in Electric Friction-Clutches; and I do hereby declare the following to be a full, clear, and exact description of the invention, which will enable others skilled in the art to which it appertains to make and use the same.

My invention relates to various new and useful improvements in electric friction clutches, which are particularly applicable to motorcycles or automobile vehicles.

The object I have in view is the production of a friction clutch which will be more certain in its operation than those heretofore constructed, and which will be compact.

Other objects will more fully appear from the following specification and accompanying drawings.

In order that my invention may be better understood, attention is directed to the accompanying drawings forming a part of this specification, and in which:—

Figure 1 is an enlarged section illustrating one form of electric clutch; Fig. 2, a face view of the clutch and gear wheel shown at the right of Fig. 1, illustrating the details thereof; Fig. 3, a cross section of Fig. 2; Fig. 4, a cross section of one of the clutches shown at the left of Fig. 1, illustrating the details thereof.

In all of the above views corresponding parts are represented by the same numerals.

A supporting shaft 9 is provided with a plurality of gears 10, 11, 12, and 13 thereon. Interposed between the gears 10, 11, 12, 13 and 14, and the shaft 9, are electric clutches 15, 16, 17, 18 and 19 respectively, which are adapted to be successively operated.

The friction clutch illustrated in the drawings comprises essentially a magnetic member 20, and an armature member 21, the former being preferably keyed directly to the shaft 9, and the latter being carried by the several gears which are capable of longitudinal movement on said shaft, thereby doing away with the necessity of keys for the sliding members. In the case of the gear 13, which is larger than the clutch, it is possible to carry the armature member directly upon one face of said gear as shown in Fig. 3, the said armature member being secured in place by bolts 22, but with the other gears which are smaller than the clutch, it is desirable to carry the armature member upon the sleeve 23, cast integral with each gear as shown in Fig. 4.

The magnetic member 20 of each electric friction clutch comprises preferably a trough shaped circular casting, having tapered pole pieces or rims 24, 25, the coil 26 being seated between said pole pieces as shown. The armature member 21 is provided with pockets 27, 27, with which the pole pieces of the magnetic member are adapted to engage, said armature member being also provided with a large overhanging rim 28 with which the outer face of the magnetic member may engage to form an increased frictional surface as will be understood. The magnetic member of each clutch is preferably keyed to a suitable spider 29, which in turn is keyed to the shaft 9, so as to hold the magnetic member of each clutch rigidly in position. The armature member of each clutch, however, is adapted to be moved toward and away from the magnetic member, the several gears being for this purpose loosely mounted upon the shaft 9, whereby the necessity of employing sliding keys is done away with. The two members of each clutch are preferably normally separated by means of a spring 30, but if desired the said springs may be dispensed with.

The connections to each coil 26 is effected by insulated wires embedded in a slot 31, cut in the shaft 9 and leading to insulated contact rings 32, one of said rings being therefore used for each clutch. The return or ground connection from each coil may be carried directly to the shaft 9, through the brush 48 (see Fig. 1) engaging and collecting ring 49 on said shaft, as will be understood.

In order that the electric current for actuating the clutch may be controlled, any suitable switch device may be used. Said switch comprises a switch arm 46, which switch arm is connected to one pole or brush of the generator 43, the other pole or brush thereof being suitably grounded, such as through a brush 48 (see Fig. 3) engaging a collecting ring 49 on the shaft 9.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new therein and desire to secure by Letters Patent is as follows:—

1. An improved electric friction clutch comprising in combination a trough shaped magnetic member having an energizing coil therein and provided with two tapering pole pieces or rims, and a coöperating armature member having pockets and an overhanging flange, substantially as set forth.

2. An improved electric friction clutch, comprising in combination a fixed trough-shaped magnetic member, having an energized coil therein, and provided with two tapering pole pieces or rims, and a loose coöperating armature member having pockets, and an overhanging flange, substantially as set forth.

3. An improved electric friction clutch, comprising in combination a trough-shaped magnetic member having an energized coil therein and provided with two tapering pole pieces or rims, and a coöperating armature member having an adjustable part carrying pockets, and an overhanging flange, substantially as set forth.

4. An improved electric friction clutch comprising in combination, a trough-shaped magnetic member having an energized coil therein and provided with two tapering pole pieces or rims, and a loose coöperating armature member having tapering pockets, and an overhanging tapering flange, substantially as set forth.

5. An improved electric friction clutch comprising in combination, a trough-shaped magnetic member having an energized coil therein and provided with two tapering pole pieces or rims, and a loose coöperative armature member having an adjustable part carrying tapering pockets, and an overhanging tapering flange, substantially as set forth.

6. An improved electric friction clutch comprising in combination, a fixed trough-shaped magnetic member having an energized coil therein and provided with two tapering pole pieces or rims, and a loose coöperating armature member having pockets, and an overhanging flange, and an interposed spring, substantially as set forth.

7. An improved electric friction clutch comprising in combination, a trough-shaped magnetic member having an energized coil therein and provided with two tapering pole pieces or rims, and a coöperating armature member having an adjustable part carrying pockets, and an overhanging flange, and an interposed spring, substantially as set forth.

This specification signed and witnessed this 28th day of July 1897.

LEONARD HUNTRESS DYER.

Witnesses:
GEO. A. BRINKMAN,
O. F. CONRAD.